(12) United States Patent
Zhang

(10) Patent No.: US 10,824,404 B2
(45) Date of Patent: Nov. 3, 2020

(54) METHODS AND SYSTEMS FOR UPLOADING A PROGRAM BASED ON A TARGET NETWORK PLATFORM

(71) Applicant: ALIBABA GROUP HOLDING LIMITED, George Town, Grand Cayman (KY)

(72) Inventor: Yang Zhang, Hangzhou (CN)

(73) Assignee: ALIBABA GROUP HOLDING LIMITED, George Town, Grand Cayman (KY)

(*) Notice: Subject to any disclaimer, the term of this patent is extended or adjusted under 35 U.S.C. 154(b) by 0 days.

(21) Appl. No.: 15/273,559

(22) Filed: Sep. 22, 2016

(65) Prior Publication Data

US 2017/0090883 A1    Mar. 30, 2017

(30) Foreign Application Priority Data

Sep. 24, 2015 (CN) .......................... 2015 1 0618350

(51) Int. Cl.
*G06F 8/36* (2018.01)
*H04L 29/08* (2006.01)
(Continued)

(52) U.S. Cl.
CPC .................. *G06F 8/36* (2013.01); *G06F 8/30* (2013.01); *G06F 8/41* (2013.01); *G06F 8/447* (2013.01);
(Continued)

(58) Field of Classification Search
CPC ..... G06F 8/30; G06F 8/34; G06F 8/36; G06F 8/41; G06F 8/60–64; G06F 11/3668;
(Continued)

(56) References Cited

U.S. PATENT DOCUMENTS 7,640,587 B2 * 12/2009 Fox ....................... G06F 21/564
726/22
7,877,725 B2 * 1/2011 Vitanov .................... G06F 8/35
717/106

(Continued)

OTHER PUBLICATIONS

Joaquín G., et al., Developing migratable multicloud applications based on MDE and adaptation techniques, Proceedings of the Second Nordic Symposium on Cloud Computing & Internet Technologies, Sep. 2013, pp. 30-37, [retrieved on Jun. 19, 2020], Retrieved from the Internet.*

(Continued)

*Primary Examiner* — Geoffrey R St Leger
(74) *Attorney, Agent, or Firm* — Finnegan, Henderson, Farabow, Garrett & Dunner, LLP

(57) ABSTRACT

Methods and devices for uploading a program based on a target network platform are described. In one implementation, the method may include the steps of sending, to a client, a target program architecture file corresponding to a target program and applicable to the target network platform; receiving, from the client, program basic code edited for the target program architecture file; and constructing a program executable file of the target program by combining the target program architecture file and the received program basic code, and uploading the program executable file to the target network platform.

30 Claims, 8 Drawing Sheets

Send, to a client, a target program architecture file corresponding to a target program and applicable to the target network platform — 101

Receive, from the client, program basic code edited based on the target program architecture file — 102

Construct a program executable file of the target program by combining the target program architecture file and the corresponding program basic code, and upload the program executable file to the target network platform — 103

(51) Int. Cl.
*G06F 8/41* (2018.01)
*G06F 11/36* (2006.01)
*G06F 8/61* (2018.01)
*G06F 8/30* (2018.01)
*G06F 8/60* (2018.01)
*H04L 29/06* (2006.01)
*G06F 21/56* (2013.01)

(52) U.S. Cl.
CPC .................. *G06F 8/60* (2013.01); *G06F 8/61* (2013.01); *G06F 8/64* (2013.01); *G06F 11/3672* (2013.01); *G06F 11/3684* (2013.01); *H04L 67/10* (2013.01); *H04L 67/42* (2013.01); *G06F 21/56* (2013.01)

(58) Field of Classification Search
CPC ...... G06F 11/3684; G06F 21/51; G06F 21/56; H04L 67/10; H04L 67/12; H04L 67/42; H04L 41/5041; H04L 41/5045; H04L 41/5048
USPC ........ 717/106–113, 124, 140, 162, 174–178; 726/22, 24
See application file for complete search history.

(56) References Cited

U.S. PATENT DOCUMENTS

| | | | | |
|---|---|---|---|---|
| 8,261,295 | B1* | 9/2012 | Risbood | G06F 9/4433 717/177 |
| 8,612,947 | B2* | 12/2013 | LeRoux | G06F 8/71 717/137 |
| 8,776,038 | B2* | 7/2014 | Larimore | G06F 16/188 717/168 |
| 9,563,544 | B2* | 2/2017 | Mecke | G06F 11/3688 |
| 2005/0086638 | A1* | 4/2005 | Farn | G06F 8/33 717/113 |
| 2006/0230449 | A1* | 10/2006 | Fox | G06F 21/564 726/22 |
| 2011/0154305 | A1* | 6/2011 | LeRoux | G06F 8/71 717/140 |
| 2013/0179858 | A1* | 7/2013 | Mecke | G06F 11/3688 717/106 |
| 2013/0205277 | A1 | 8/2013 | Seven et al. | |
| 2013/0326487 | A1 | 12/2013 | Yousouf et al. | |
| 2014/0025633 | A1 | 1/2014 | Namini | |
| 2014/0040871 | A1* | 2/2014 | Schwan | G06F 8/71 717/141 |
| 2014/0068549 | A1* | 3/2014 | Friedman | G06F 8/30 717/104 |
| 2014/0189679 | A1* | 7/2014 | Adams | G06F 9/44578 717/174 |
| 2015/0186193 | A1 | 7/2015 | Jain et al. | |
| 2016/0092343 | A1* | 3/2016 | Chhatwal | G06F 11/3664 717/124 |
| 2016/0216948 | A1* | 7/2016 | McPherson | G06F 8/36 |
| 2017/0132197 | A1* | 5/2017 | Balasubramanian | G06F 17/212 |

OTHER PUBLICATIONS

Sampaio, A., et al., Uni4Cloud: An Approach based on Open Standards for Deployment and Management of Multi-cloud Applications, Proceedings of the 2nd International Workshop on Software Engineering for Cloud Computing, May 2011, pp. 15-21, [retrieved on Jun. 19, 2020], Retrieved from the Internet.*

PCT International Search Report and Written Opinion dated Dec. 27, 2016, issued in corresponding International Application No. PCT/US16/53576 (8 pages).

EPO communication enclosing the extend European search report, which includes, pursuant to Rule 62 EPC, the supplementary European search report (Art. 153(7) EPC) and the European search opinion, dated Jul. 18, 2018, issued in application No. 16849809. 5-1213 (7 pages).

* cited by examiner

METHODS AND SYSTEMS FOR UPLOADING A PROGRAM BASED ON A TARGET NETWORK PLATFORM

CROSS-REFERENCE TO RELATED APPLICATION

This application claims priority to and benefits of Chinese Patent Application Serial No. 201510618350.9, filed with the State Intellectual Property Office of P. R. China on Sep. 24, 2015, which is incorporated herein by reference in its entirety.

TECHNICAL FIELD

The present disclosure relates to the field of Internet technologies, and more particularly to methods and systems for uploading program code based on a target network platform.

BACKGROUND

With the rapid development of services, applications, and delivery methods on the Internet, network platforms are becoming widely applied. For example, Platform as a Service (PaaS), a network platform can be used as a basic platform that provides a software development environment. The platform provides a database and application services. Further, a software provider may develop software in accordance with the requirement of a user and upload the software to the platform, allowing for providing customized software or software customization service to the user.

Generally, a software provider may first develop software by performing different tasks, such as coding and debugging, in a local development environment. To make the software applicable to run on the network platform, various operations, such as configuration, packaging, and compiling, need to be performed on the program code written for the software in accordance with a program requirement document provided by the network platform. The program code compiled in accordance with the operations may then be configured and deployed in accordance with execution conditions of the network platform in a development environment of the network platform, thereby allowing for implementing, launching, and/or running of the software on the network platform.

Currently, during the development of software for a network platform, in addition to coding and debugging in a local development environment, a user, e.g., a software developer, also needs to perform many complex operations in the development environment of the network platform, such as configuration, uploading, and deployment. These operations are irrelevant to the service development on the network platform. For the user, first, this may take the user a lot of time and energy to perform the complex configurations, uploading, and deployment in the development environment of the network platform. Second, the user may easily make mistakes when performing the complex and cumbersome configurations, which may further cause a failure of running the software on the network platform. Moreover, the separate development environments (e.g., the user's local development environment and the development environment of the network platform) may easily cause program incompatibility, and software whose program code have been successfully debugged locally may fail to run normally on the network platform.

Further, for the network platform, if the user is allowed to directly upload compiled software, it is inconvenient to review the program code of the software. When the software includes a malicious program, it may affect the security of the network platform.

SUMMARY

Embodiments of the present disclosure provide methods and systems for uploading a program based on a target network platform, to solve the problems described above and other technical problems.

In one aspect, the present disclosure provides a method for uploading a program based on a target network platform. The method may include sending, to a client, a target program architecture file corresponding to a target program and applicable to the target network platform, receiving, from the client, program basic code edited for the target program architecture file, and constructing a program executable file of the target program by combining the target program architecture file and the received program basic code, and uploading the program executable file to the target network platform.

In another aspect, the present disclosure provides a system for uploading a program based on a target network platform. The system may include a first sending module that sends, to a client, a target program architecture file corresponding to a target program and applicable to the target network platform, a receiving module that receives, from the client, program basic code edited for the target program architecture file, and a constructing module that constructs a program executable file of the target program by combining the target program architecture file and the received program basic code, and uploads the program executable file to the target network platform.

In another aspect, the present disclosure provides a non-transitory computer-readable medium that stores a set of instructions that are executable by at least one processor of a server to cause the server to perform a method for uploading a program based on a target network platform. The method may include the steps of sending, to a client, a target program architecture file corresponding to a target program and applicable to the target network platform; receiving, from the client, program basic code edited for the target program architecture file; and constructing a program executable file of the target program by combining the target program architecture file and the received program basic code, and uploading the program executable file to the target network platform.

Additional features and advantages of the disclosed embodiments will be set forth in part in the description that follows, and in part will be obvious from the description, or may be learned by practice of the disclosed embodiments. The features and advantages of the disclosed embodiments will be realized and attained by the elements and combinations particularly pointed out in the appended claims.

It is to be understood that both the foregoing general description and the following detailed description are examples and explanatory only and are not restrictive of the disclosed embodiments as claimed.

The accompanying drawings constitute a part of this specification. The drawings illustrate several embodiments of the present disclosure and, together with the description, serve to explain the principles of the disclosed embodiments as set forth in the accompanying claims.

BRIEF DESCRIPTION OF THE DRAWINGS

The accompanying drawings, which are incorporated in and constitute a part of this specification, illustrate exemplary embodiments of the present disclosure, and together with the description, serve to explain the principles of the disclosure.

DETAILED DESCRIPTION

Reference will now be made in detail to embodiments and aspects of the present disclosure, examples of which are illustrated in the accompanying drawings. Where possible, the same reference numbers will be used throughout the drawings to refer to the same or like parts.

Figure 1:
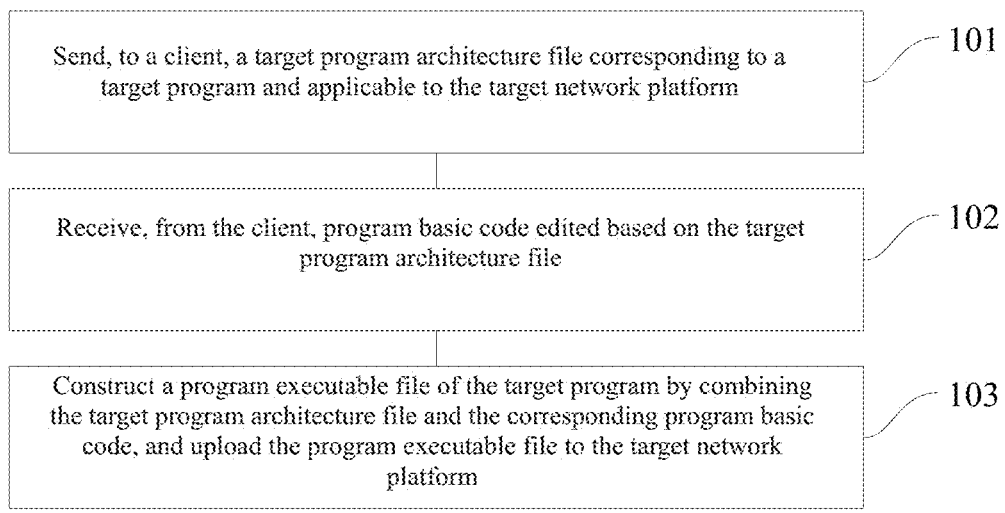
FIG. 1 is a flowchart of an exemplary method for uploading a program based on a target network platform, consistent with embodiments of the present disclosure.

FIG. 1 is a flowchart of an exemplary method for uploading a program based on a target network platform, consistent with embodiments of the present disclosure. As described herein, a program may refer to a computer program or a software program having a collection of instructions that are executable by a computer or a processor for performing functions or tasks. The method may include the following steps:

Step 101: Send, to a client, a target program architecture file corresponding to a target program and applicable to the target network platform.

A network platform is an interaction platform that provides information and application services through the Internet. For example, a developer of an application program may develop and share an application program through the network platform. An end user may acquire a service provided by the application program through the network platform. When used as a platform providing service for the development of an application program (e.g., PaaS) and/or a platform providing an application program as a service (e.g., software as a service (SaaS), the network platform may also be referred to as Cloud Platforms.

Cloud is a metaphor for the networks and the Internet, and may represent the Internet and its underlying infrastructure. Cloud Computing is a result of the integration of conventional computer technologies, such as distributed computing, parallel computing, utility computing, network storage, virtualization, and load balancing, and the development of network technologies. Cloud Computing is a major transformation in the field of Internet technologies. The emergence of various cloud platforms is one of the most important stages in this transformation. As its name implies, a cloud platform may allow users to put programs in a "cloud" for cloud computing, and/or may allow users to use cloud computing services provided in the "cloud."

A cloud platform generally may include a Foundation element (the foundation of the platform), an Infrastructure element (e.g., for providing infrastructure services), and an Application element (e.g., for providing application or software services). The Foundation element may include a standard database and a basic operating system. The Infrastructure element may include a distributed computer system, which may have multiple computers located in different areas providing basic services, such as a remote storage service, an integration service, and an identity management service. The Application element may be available to vast application program developers, who may provide corresponding application or software services to end users through the cloud platform.

The cloud platform provides cloud computing services and application services. On one hand, the cloud computing services and application services can be used by the application program developers during program development, which improves development efficiency. For example, it is not necessary to construct new operation foundations for application programs. The cloud platform may be relied upon for developing and running new application programs. On the other hand, various application services and cloud computing services can be provided to end users, who may obtain more convenient and a wider range of network services. Additionally, the cloud platform may be open and allow for sharing resources. For example, programs on the cloud platform may be shared by or support multiple users. Such feature of supporting multiple users by one platform may allow for a maximum degree of program and data resource sharing. This may allow software providers or developers to focus on the programs to be developed and sent, rather than managing and maintaining the platform for running the programs and related systems. Advantageously, for small enterprises that do not rely on the integration of old programs, developing and sending software by using the cloud platform reduces the pressure of translating the software or application to networks or mobile devices.

However, the cloud platform may be a public platform that is open to vast users and provides cloud computing. First, performing distributed cloud computing by running programs on the cloud platform is completely different from performing computing in a conventional manner on a private server. Second, because the cloud platform is an open public platform, the security of running programs on the cloud platform may need to be considered. Furthermore, different cloud platforms may have different requirements for programs. Therefore, when a program is developed for a specific cloud platform, a basic program architecture of the program may be adjusted in accordance with requirements of the cloud platform, such as a program uploading interface, configuration parameters, and program architecture. The program is constructed and deployed based on the basic program architecture to ensure that the constructed and deployed program is applicable to the specific cloud platform.

In some implementations, a basic program architecture file of a target program may be updated in accordance with the requirements of a target cloud platform, thereby generating a target program architecture file applicable to the target cloud platform. The requirements of the target cloud platform may include a program uploading interface, configuration parameters, and a program framework of the target cloud platform. Multiple types of programs can run on cloud platforms, such as Open Data Processing Service programs (ODPS), MapReduce programs (developed based on map reduce programming model), a User-Defined Function (UDF), and Graph program (developed for drawing graphs of functions). Therefore, for different programs, different program architecture files need to be obtained. To make it convenient for users to use, program architecture files may be displayed on a preset graphical program editing interface. This allows the users to learn about the specific architectures of the programs on the graphical program editing interface.

Step 102: Receive, from the client, program basic code edited based on the target program architecture file.

When developing a given target program for a given network platform, the client may select a corresponding target program architecture file, edit program basic code based on the target program architecture file, and upload the program basic code edited based on the target program architecture file to a server end. Program basic code may refer to the source code of a program or an application.

Step 103: Construct a program executable file of the target program by combining the target program architecture file and the received program basic code, and upload the program executable file to the target network platform.

Because the received program basic code is edited in accordance with the target program architecture file applicable to the target network platform, the target program architecture file and the embedded program basic code can be directly used to construct the program executable file, and the constructed program executable file is uploaded to the target network platform.

The exemplary method described above may be implemented in various manners. For example, the method of generating a program architecture file applicable to the target network platform, editing program basic code based on the program architecture file, and constructing a program executable file by combining the program architecture file and the program basic code may be implemented by using a combination of software tools, such as a local Integrated Development Environment (IDE) and a Life-cycle Management (LCM) software.

In some embodiments, the LCM software may be Maven for constructing or building a program. Maven is a software project management tool based on a project object model (POM), and allows for managing project construction, reports, and documents by using a small piece of description information. Besides the capability of building a program, Maven further provides an advanced project management tool. Because a default building rule of Maven is highly reusable, a simple project (e.g., program) can be built by using a short Maven build script.

In some embodiments, by using customized Archetype (program project scaffolding) in the Maven LCM software, the server end may, in accordance with program requirements of the network platform, create a program directory structure, a program architecture file, a preset configuration file, sample code, a unit test framework, etc., and may send these to the client. By using the development auxiliary plugins developed by Maven for the local IDE, such as Eclipse or IDEA, a user may obtain the corresponding program directory structure, program architecture file, preset configuration file, sample code, and unit test framework. The user may further perform program basic code editing, program configuration, program local testing, and program uploading in the local IDE by using functions provided by the development auxiliary plugins, such as new project wizard (Configuration Wizard), visual configuration editing, visual server end communication, and local unit testing. It is appreciated that similar solutions implemented consistent with the embodiments of the present disclosure can also be used. For example, other suitable LCM software may be used, such as Ant, Ivy, and Gradle, or software developed using a Software Development Kit (SDK) and compiled in accordance with a specific network platform.

In some embodiments, the local IDE system is Eclipse. Eclipse is a Java-based, open source, extensible development platform. In these embodiments, Eclipse may provide a building framework and various plugin component services, and may build a development environment by using the building framework and plugin components. In addition, Eclipse may further include a plugin development environment (PDE), which allows for building plugin components that can be seamlessly integrated with the Eclipse environment.

Similar solutions implemented consistent with embodiments of the present disclosure can also be used. For example, other IDE development environment may be used, such as IDEA and Visual Studio.

In accordance with embodiments of the present disclosure, a target program architecture file corresponding to a target program and applicable to a target network platform is sent to a client. The client may edit program basic code based on the target program architecture file, construct a program executable file of the target program by combining the target program architecture file and the received program basic code, and upload the constructed program executable file to the target network platform. Advantageously, embodiments of the present disclosure reduces the burden of a user to perform operations that are irrelevant to the development of the software for the target network platform, such as configuration, uploading, and deployment, thereby saving time and energy for the user. Besides, the user does not need to perform complex and cumbersome configurations manually when uploading the program to the network platform. This may limit or prevent a running failure of the software on the network platform caused by a configuration error made by the user. Moreover, the program executable file constructed based on the target program architecture file avoids separating a development environment and the network platform, and thus improves the compatibility of the program.

Figure 2:
FIG. 2 is a flowchart of an exemplary method for uploading a program based on a target network platform, consistent with embodiments of the present disclosure.

FIG. 2 is a flowchart of an exemplary method for uploading a program based on a target network platform, consistent with embodiments of the present disclosure. The method may include the following steps:

Step 201: In accordance with a program requirement document of a target program on the target network platform, update a basic program architecture file corresponding to the target program and applicable to multiple network platforms to obtain a target program architecture file applicable to the target network platform.

In some situations, a program developed for multiple different network platforms may have multiple basic program architecture files applicable to the different network platforms. Further, requirements of the target network platform on the target program are usually provided in a form of a program requirement document. Therefore, the basic program architecture file corresponding to the target program and applicable to multiple network platforms may be updated in accordance with the program requirement document that is on the target network platform and corresponds to the target program, allowing for obtaining the target program architecture file applicable to the target network platform.

Step 202: Send the target program architecture file to the client when a request is received from the client for editing the target program.

Step 203: Display, on a program editing page of the client, editing areas of multiple divided functional components of the target program in accordance with the target program architecture file, and provide code editing portals corresponding to the multiple functional components in the editing areas.

Step 204: Receive program basic code submitted for the functional components on the program editing page of the client.

A user may submit, from the client, a request for editing a target program. When the request is received, a corresponding target program architecture file may be sent to the client and displayed. For a program, a certain architecture is usually formed based on multiple functional components of the program. One or more editing areas of the functional components may be used as display units. Therefore, on a program editing page, editing areas of multiple functional components divided for the target program in accordance with the target program architecture file may be displayed. Code editing portals of the functional components may be provided correspondingly in the editing areas. On the program editing page of the client, for each functional component, the user can edit program basic code by using the code editing portal in the corresponding editing area.

Step 205: Extract, from a database of common function code, common function code relied upon by the target program in accordance with a configuration file preset for the target program.

Step 206: Embed the program basic code received from the client and the extracted common function code at corresponding locations in the target program architecture file.

In accordance with the present disclosure, because the user does not need to directly upload a program executable file to the network platform, the user may not need to write or edit at least some common function code relied upon for uploading the program executable file to the network platform. However, such common function code needs to be configured before uploading the program basic code to the network platform. Therefore, the preset configuration file may be used to implement configuration steps before the uploading the program basic code to the network platform. For example, a server may read a structured-text configuration file, and perform configuration steps on the program basic code uploaded by the user.

In some embodiments, the common function code relied upon for configuring the program basic code may be extracted from the database of common function code based on dependence information read from the configuration file preset for the target program by the target network platform. For example, when Maven and Eclipse are combined to develop an ODPS, the ODPS may depend on and is related to a Jar package (Java Archive). The Jar package may be stored in a Maven Repo (Maven remote repository) and extracted from the Maven Repo. The extracted common function code may be embedded at a corresponding location in the target program architecture file.

Step 207: Compile and package the target program architecture file to generate a program executable file of the target program, the program basic code uploaded by the client and the extracted common function code being embedded in the target program architecture file.

After the foregoing steps, the target program architecture file includes program basic code composed in accordance with a particular architecture and the common function code relied upon by the program basic code. The target program architecture file may be packaged and compiled to generate the program executable file of the target program. There are multiple ways for performing the packaging including, such as packaging based on an Export (export) function of Eclipse, packaging based on a Jar command, etc. There are also multiple ways for compiling, such as compiling based on a run (run) function of Eclipse, compiling based on a cmd (command prompt) command, etc.

Step 208: Upload the program executable file to the target network platform.

In accordance with the present disclosure, editing areas of multiple functional components of a target program divided in accordance with a target program architecture file are displayed on a program editing page. Code editing portals of the corresponding functional components are provided in the editing areas such that a user can edit code more conveniently.

Figure 3:
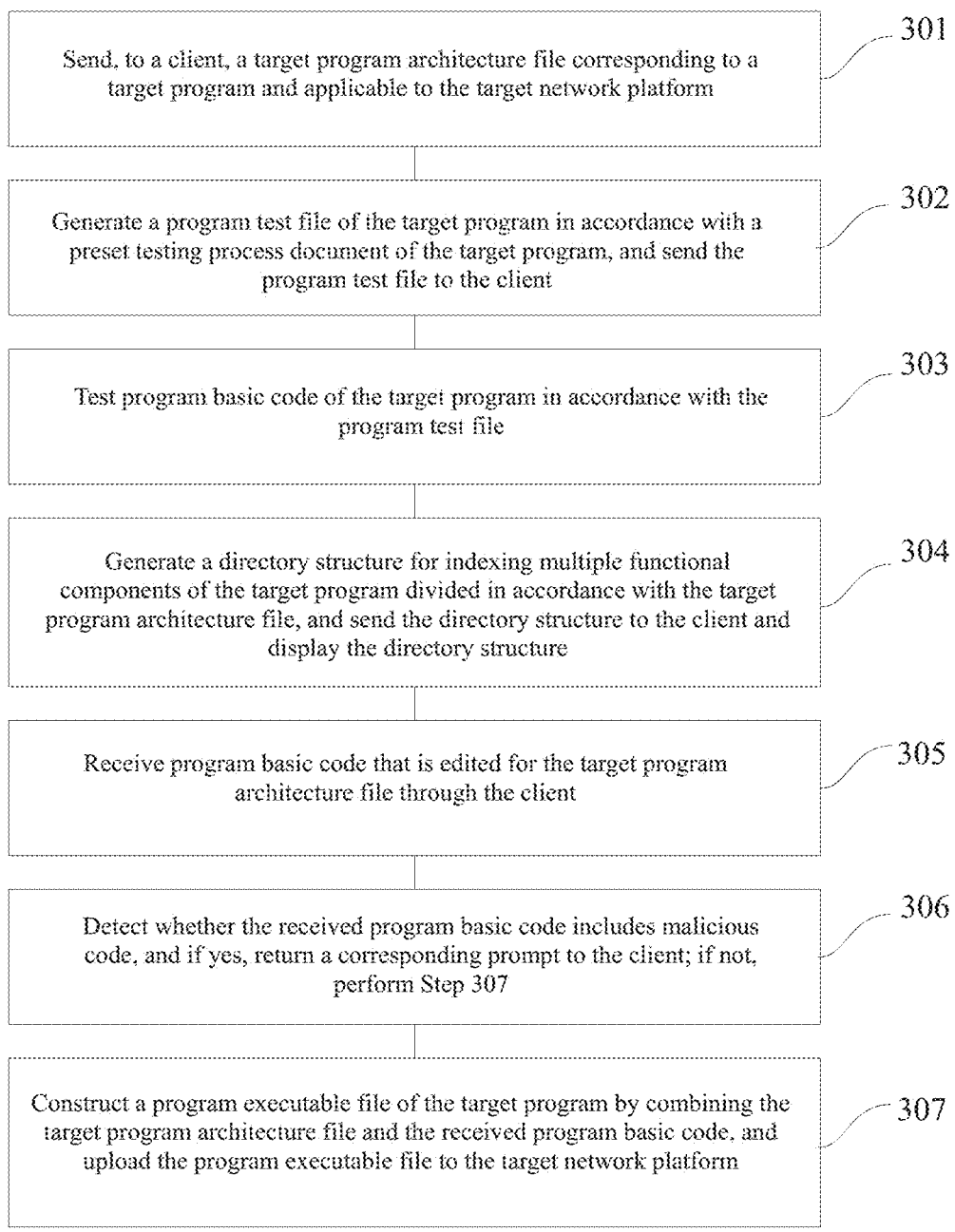
FIG. 3 is a flowchart of an exemplary method for uploading a program based on a target network platform, consistent with embodiments of the present disclosure.

FIG. 3 is a flowchart of an exemplary method for uploading a program based on a target network platform, consistent with embodiments of the present disclosure. The method may include the following steps:

Step 301: Send, to a client, a target program architecture file corresponding to a target program and applicable to the target network platform.

Step 302: Generate a program test file of the target program in accordance with a preset testing process document of the target program, and send the program test file to the client.

Step 303: Test program basic code of the target program in accordance with the program test file.

The program test file may include a unit test framework or a test auxiliary plugin. In some embodiments, the program test file of the target program may be generated by using information in the preset testing process document of the target program, and sent to the client, allowing for testing the program basic code on the client. For example, in some instances, Maven and Eclipse are combined to develop a MapReduce program, the Maven-surefire plugin may be used to execute the JUnit test case or TestNG test case. Junit and TestNG are both unit test frameworks for Java programs.

Step 304: Generate a directory structure for indexing multiple functional components of the target program divided in accordance with the target program architecture file, and send the directory structure to the client and display the directory structure.

In some implementations, the target program is divided into multiple functional components in accordance with the target program architecture file. A directory structure may be generated for the divided multiple functional components, and may be sent to the client for display. The directory structure may be used for indexing the functional components, so that the user can clearly learn the architecture of the entire program.

In some embodiments of the present disclosure, a configuration file of the target program may further be generated on the target network platform in accordance with the target program, and sent to the client.

Additionally or alternatively, sample code of the functional components of the target program may be generated in accordance with relationships, e.g., dependency, between the functional components of the target program, and sent to the client and displayed.

Step 305: Receive program basic code edited for the target program architecture file from the client.

Step 306: Detect whether the received program basic code includes malicious code, and if yes, send a corresponding prompt to the client, and if not, perform Step 307.

Because the program basic code uploaded by the client is not packaged or compiled and does not include bytecode, the program basic code can be reviewed to detect whether it includes malicious code. When it is detected that the program basic code includes malicious code, if the program basic code is allowed to generate a program executable file and the program executable file is launched and runs on network platform, it may threaten the security of the entire network platform. Therefore, a prompt may be sent to the user to notify that the data (e.g., data corresponding to the program basic code) uploaded thereby is rejected. When the program basic code is legal, the subsequent step of constructing a program executable file can be performed. In some embodiments of the present disclosure, the quality of the program basic code may further be checked, including checking whether there is error code, whether the code service logic is correct, whether the code meets preset code standards, whether the code is sufficiently secure, etc.

In some embodiments of the present disclosure, dynamic detection may be performed on the program basic code. For example, the program executable file may be executed in a preset detection sand box (Sand Box) on the network platform to monitor an execution behavior of the program executable file. When an exception occurs in the execution behavior, the execution of the program executable file is terminated. It is appreciated that static detection and/or dynamic detection may be used in accordance with the requirements in practice.

Step 307: Construct a program executable file of the target program by combining the target program architecture file and the received program basic code, and upload the program executable file to the target network platform.

In some embodiments of the present disclosure, step 307 may include the following sub-steps:

Sub-step S11: Add, to a preset task list, to-be-processed tasks of constructing a program executable file and uploading a program executable file for the received program basic code.

Sub-step S12: Query the preset task list and execute the to-be-processed tasks in the preset task list.

Sub-step S13: Update the task list in accordance with an execution status of the to-be-processed tasks.

Sub-step S14: Send the execution status of the to-be-processed tasks to the client, or receive a request from the client for querying the task list and send a corresponding execution status.

Because there may be multiple programs to be uploaded to the network platform, to avoid conflict in program uploading, a task list may be used to execute to-be-processed tasks. The task list may be preset on the network platform. The received program basic code may be added to the task list as a to-be-processed task. The task list may be queried, and when there is a to-be-processed task in the task list, the to-be-processed task is extracted and executed. The task list may be updated in accordance with the execution status of the task, such as, waiting, receiving, packaging and compiling, and uploading. The execution status may be sent to the client, or a corresponding execution status is sent when a request from the client is received querying the execution status.

In some embodiments of the present disclosure, Step 307 may include the following sub-steps:

Sub-step S21: Search for and extract common function code from a database of the common function code when the program basic code includes an identifier for the common function code.

In some embodiments of the present disclosure, corresponding common function code may also be extracted from the database of common function code in accordance with a request from the client and be sent to the client.

In some embodiments, when a user writes or edits program basic code, the user may cite some common function code in a local database or some approved third-party common function code by adding a link identifier. Therefore, by detecting an identifier for common function code in the received program basic code, or by monitoring a keyword part in the program basic code, the corresponding common function code can be searched for in the database of common function code, and can be extracted. The extracted common code may be embedded at a location of the identifier in the target program architecture file.

Currently, the methods for uploading a program to a network platform allows a user to directly upload a packaged and compiled program executable file to the network platform and directly launch and run the program on the network platform. The program executable file uploaded in this manner includes Bytecode, which is inconvenient for reviewing the program executable file and undesirable for maintaining the security of the network platform. In embodiments consistent with the present disclosure, program basic code uploaded by a user is received and reviewed. When the program basic code is determined to be legal, the subsequent steps of generating a program executable file and uploading the program executable file to a network platform are performed, which improves the convenience of reviewing the program and the security of the network platform.

The following provides examples of the method consistent with embodiments of the present disclosure.

Figure 4:
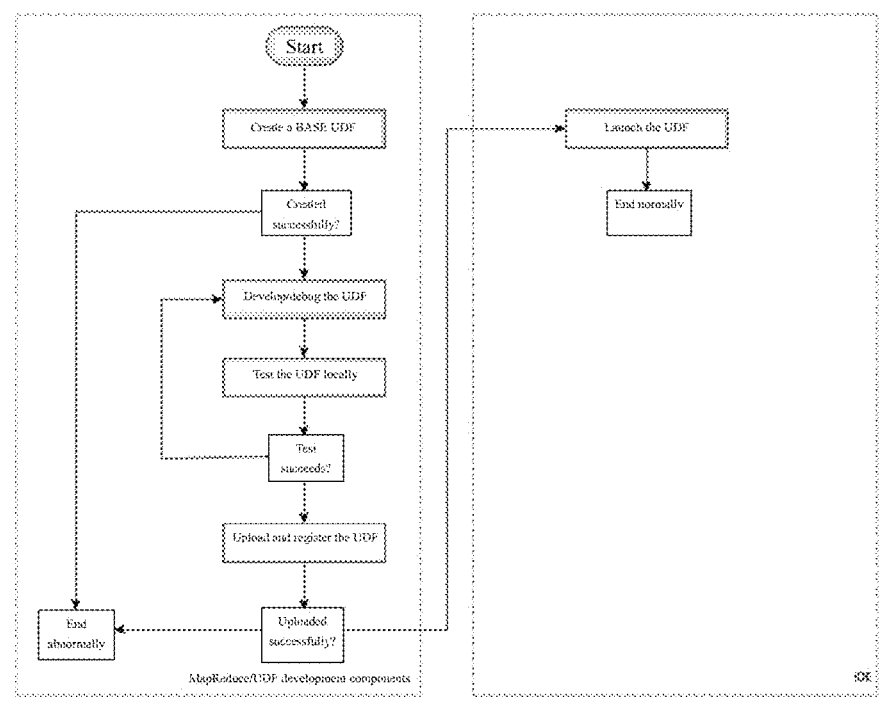
FIG. 4 is a flowchart of an exemplary method for uploading a program based on a target network platform, consistent with embodiments of the present disclosure.

FIG. 4 is a flowchart of an exemplary method for uploading a program based on a target network platform, consistent with embodiments of the present disclosure. The flow chart shown in FIG. 4, illustrates a method for uploading a UDF based on a network platform in the present disclosure. The left part of FIG. 4 shows a procedure of the method on a client end, and the right part shows a procedure of the method on a server end. In the procedure on the client, a UDF project may be created in a local IDE to develop and debug a UDF and perform a local test. If the local test fails, the method may return to the step of developing and/or debugging the UDF. If the local test succeeds, the UDF may be uploaded to the server end and the UDF may be registered correspondingly. After performing one or more steps, such as reviewing, packaging, and compiling, the server may launch the UDF on the network platform, and the entire procedure ends normally after the launch. If the client fails to the upload the UDF to the server or fails to create a UDF project, the procedure ends abnormally, and a corresponding processing step is performed.

Figure 5:
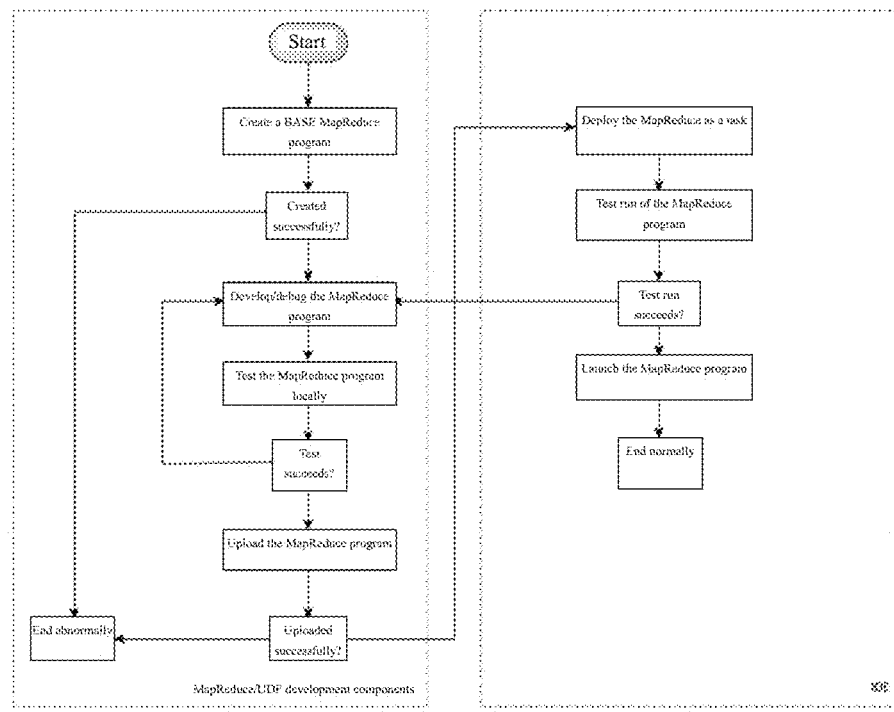
FIG. 5 is a flowchart of an exemplary method for uploading a program based on a target network platform, consistent with embodiments of the present disclosure.

FIG. 5 is a flowchart of an exemplary method for uploading a program based on a target network platform, consistent with embodiments of the present disclosure. The flow chart shown in FIG. 5 illustrates a method for uploading a MapReduce program based on a network platform. The left part of FIG. 5 shows a procedure of the method on a client end, and the right part shows a procedure of the method on a server end. In the procedure on the client, a MapReduce program may be created in a local IDE to perform development, debugging, and local test for the MapReduce program. If the local test fails, the method return to the step of developing and/or debugging a MapReduce program. If the test succeeds, the MapReduce program may be uploaded to the server. The server may deploy the received MapReduce program, and after some processing steps, such as reviewing, packaging, and compiling, the server may perform a test run. If the test run fails, the server instructs the client to perform development and/or debugging again. If the test run succeeds, the server may launch the MapReduce program on the network platform. The entire procedure ends normally after the launch. If the client fails to the upload the MapReduce program to the server or fails to create a MapReduce project, the procedure ends abnormally, and a corresponding processing step is performed.

Figure 6:
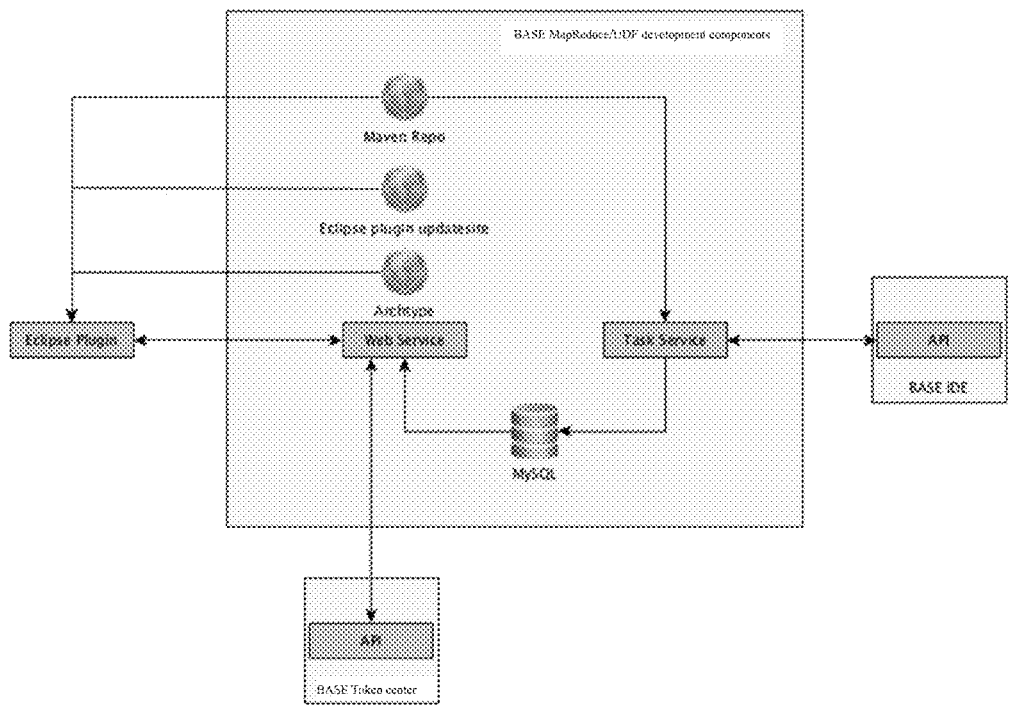
FIG. 6 is a schematic block diagram illustrating an exemplary system for uploading a program based on a target network platform, consistent with embodiments of the present disclosure.

FIG. 6 is a schematic block diagram illustrating an exemplary system for uploading a program based on a target network platform, consistent with embodiments of the present disclosure. As shown in FIG. 6, a system for uploading a MapReduce/UDF program may use the combination of Maven and Eclipse. An Eclipse plugin installation and upgrade module on a server end may be used to install and upgrade Eclipse plugins on the client. Various features of the Eclipse plugins may be used to perform program development, such as wizards that provide guidance on the creation of a project, visual configuration editing, visual communication with a service end, and local unit tests etc. Maven Archetype on the server end may be used to create a MapReduce/UDF program through Maven. The Maven Archetype may include a directory structure, a program architecture file, a default configuration file, sample code, a unit test framework, etc. A Maven Repo database may be used to store code packages needed to be used for building a program. When program basic code is being packaged and compiled, only the code packages in the Maven Repo may be allowed to be used. A Web service program may provide an Application Programming Interface (API) through an HyperText Transfer Protocol (HTTP). The API interface may be called by the Eclipse plugins.

A Task service program may perform pre-processing, static detection, compiling, etc., on program code uploaded by a user, and may communicate with the network platform. The Web service program and the Task service program may exchange data by using MySQL as a Queue (queue). Further, a self-defined MR wrapper may be used to run a program executable file and/or to implement log filtering with a materialized view. The Web service may acquire related token packages (Token) by controlling an API interface of a central server.

The Web service used in this embodiment of the present disclosure includes platform-independent, low-coupling, self-contained, and programmable network application programs. These application programs may be described, launched, discovered, coordinated, and/or configured using an open XML (extensible markup language, which is a subset of the standard generalized markup languages) to develop distributed interoperable application programs. The Web Service may allow different applications running on different machines to perform data exchange or integration without using an additional dedicated third-party software or hardware. Applications implemented in accordance with the standard of the Web Service may perform data exchange with each other regardless of languages, platforms, or internal protocols they use.

Figure 7:
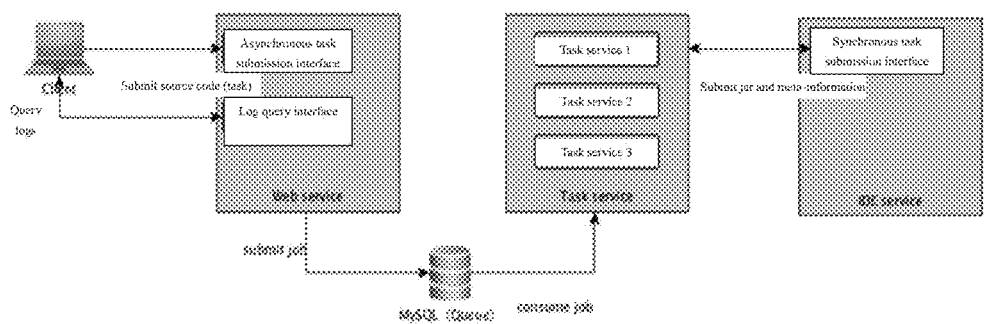
FIG. 7 illustrates an exemplary data exchange between a client and a network platform in an exemplary method for uploading a program based on a target network platform, consistent with embodiments of the present disclosure.

FIG. 7 illustrates an exemplary data exchange between a client and a network platform in an exemplary method for uploading a program based on a target network platform, consistent with embodiments of the present disclosure. As shown in FIG. 7, the client may call an asynchronous task submission interface by using an Eclipse plugin, to submit a task to the Web service. By using the asynchronous task submission interface, the client may effectively prevent a client program from being blocked by too many tasks of the Web service, thereby improving user experience. A Web service program may insert a new task into a task list, e.g., async_task, by way of data recording, set Status (processing status) of the new task to 0, suggesting a to-be-processed task, and send a submission status to the client. The client may query a log query interface to query the execution status of the task. The log query interface may query a log by reading the task list, e.g., async_task. The Web service program and a Task service program may perform data exchange by using MySQL as a Queue. The Task service program may continuously query the task list, e.g., async_task. If there is a new task, the new task is extracted, and the status of the task is set to 1, suggesting that the task is being processed. The Task service program may perform pre-processing, scanning, compiling, and packaging on the received program code of the program to be uploaded. The Task service program may then call a synchronous task submission interface of the network platform to submit related code packages and source data to the network platform. After the Task service program uploads the program to the network platform by using the synchronous task submission interface, the network platform can find the corresponding program when running the program. The Task service program may send an uploading status to the Web service, and the Web service may update the task list, e.g., async_task.

The exemplary method consistent with embodiments of the present disclosure are described as a combination of or a sequence of steps. However, it is appreciated that the embodiments of the present disclosure are not restricted by the described sequence of steps. As described herein, some steps of the method may be performed in accordance with other sequences or performed at the same time.

Figure 8:
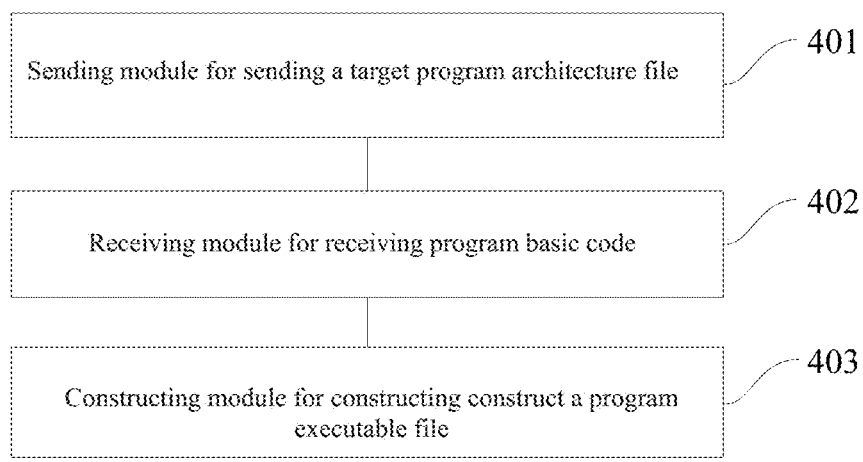
FIG. 8 is a schematic block diagram illustrating an exemplary system for uploading a program based on a target network platform, consistent with embodiments of the present disclosure.

FIG. 8 is a schematic block diagram illustrating an exemplary system for uploading a program based on a target network platform, consistent with embodiments of the present disclosure. As shown in FIG. 8, the exemplary system may include the following modules: a sending module 401, a receiving module 402, and a constructing module 403.

The sending module 401 is configured to send a target program architecture file to a client. The target program architecture file corresponds to a target program and applicable to the target network platform.

The receiving module 402 is configured to receive program basic code edited for the target program architecture file from the client.

The constructing module 403 is configured to construct a program executable file of the target program by combining the target program architecture file and the corresponding program basic code, and upload the program executable file to the target network platform.

Consistent with the embodiments of the present disclosure, the exemplary system for uploading a program based on a target network platform sends, to a client, a target program architecture file corresponding to a target program and applicable to the target network platform. The client may edit program basic code in accordance with the target program architecture file, construct a program executable file of the target program by combining the target program architecture file and the received program basic code, and upload the constructed program executable file to the network platform. The system reduces the burden of a user when developing a software program for the network platform. The user, e.g., software developer, may not need to perform operations, such as configuration, uploading, and deployment, that are irrelevant to the development of the software program, thereby saving time and energy for the user. Additionally, the user does not need to perform complex and cumbersome configurations manually during the process of uploading the program to the network platform. This may limit or prevent a running failure of the software on the network platform caused by a configuration error made by the user. Moreover, the program executable file constructed based on the target program architecture file avoids separating an development environment and the network platform, and thus improves the compatibility of the program.

Figure 9:
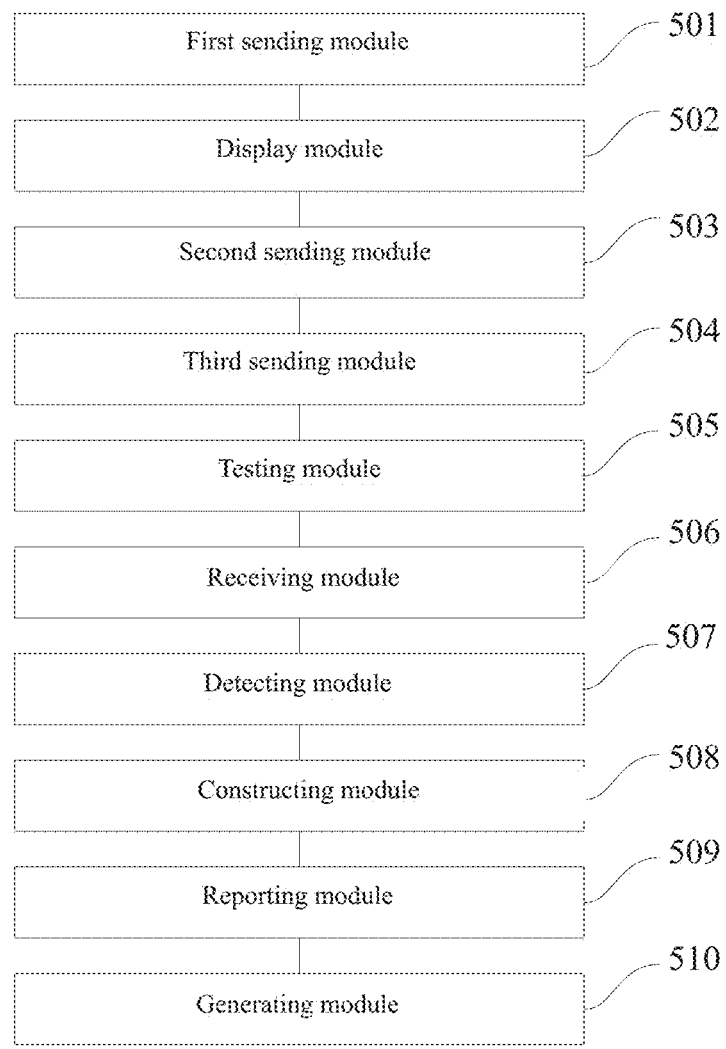
FIG. 9 is a schematic block diagram illustrating an exemplary system for uploading a program based on a target network platform, consistent with embodiments of the present disclosure

FIG. 9 is a schematic block diagram illustrating an exemplary system for uploading a program based on a target network platform, consistent with embodiments of the present disclosure. As shown in FIG. 9, the exemplary system may include the following modules: a first sending module 501, a display module 502, a second sending module 503, a third sending module 504, a testing module 505, a receiving module 506, a detecting module 507, a constructing module 508, a reporting module 509, and a generating module 510.

The first sending module 501 is configured to send, to a client, a target program architecture file corresponding to a target program and applicable to the target network platform.

The display module 502 is configured to display, on a program editing page, editing areas of multiple functional components of the target program divided in accordance with the target program architecture file, and provide code editing portals of the corresponding functional components in the editing areas.

The second sending module 503 is configured to extract, in accordance with a request of the client, corresponding common function code from a database of common function code, and send the extracted common function code to the client.

The third sending module 504 is configured to generate a program test file of the target program in accordance with a preset testing process document of the target program, and send the program test file to the client.

The testing module 505 is configured to test program basic code of the target program in accordance with the program test file.

The receiving module 506 is configured to receive, from the client, the program basic code edited based on the target program architecture file.

The detecting module 507 is configured to detect whether the received program basic code includes malicious code, and if yes, send a corresponding prompt to the client.

The constructing module 508 is configured to construct a program executable file of the target program by combining the target program architecture file and the received program basic code, and upload the program executable file to the target network platform.

The reporting module 509 is configured to send an execution status of to-be-processed tasks to the client, or receives a request from the client for querying the task list, and send a corresponding execution status.

The generating module 510 is configured to generate a directory structure for indexing the multiple functional components of the target program divided in accordance with the target program architecture file, send the directory structure to the client, and display the directory structure.

In some embodiments of the present disclosure, the first sending module 501 may include the following sub-modules: an updating sub-module and a receiving sub-module.

The updating sub-module is configured to update, in accordance with a program requirement document on the target network platform, a basic program architecture file corresponding to the target program and applicable to multiple network platforms to obtain the target program architecture file applicable to the target network platform of the target program.

The receiving sub-module is configured to send the target program architecture file to the client when receiving a request from the client for editing the target program.

In some embodiments of the present disclosure, the receiving module 506 may include a receiving sub-module.

The receiving sub-module is configured to receive the program basic code submitted for the functional components on the program editing page of the client.

In some embodiments of the present disclosure, the constructing module 508 may include the following sub-modules: an extracting sub-module, an embedding sub-module, and a compiling and packaging sub-module.

The extracting sub-module is configured to extract, from a database of common function code, common function code relied upon by the target program in accordance with a configuration file preset for the target program.

The embedding sub-module is configured to embed the program basic code uploaded by the client and the extracted common function code at corresponding locations in the target program architecture file.

The compiling and packaging sub-module is configured to compile and package the target program architecture file to generate the program executable file of the target program. The target program architecture file has been embedded with the program basic code uploaded by the client and the extracted common function code.

In some embodiments of the present disclosure, the constructing module 509 may include the following sub-modules: a task adding sub-module, a task query sub-module, and a task list updating sub-module.

The task adding sub-module is configured to add, to the task list, to-be-processed tasks of constructing a program executable file and upload the program executable file for the received program basic code.

The task query sub-module is configured to query and execute the to-be-processed tasks in the preset task list.

The task list updating sub-module is configured to update the task list in accordance with the execution status of the to-be-processed tasks.

In some embodiments of the present disclosure, the constructing module 508 may include a searching sub-module.

The searching sub-module is configured to search for and extract the corresponding common function code in the database of common function code when the program basic code includes an identifier for the common function code.

In embodiments of the present disclosure, editing areas of multiple functional components that are divided for a target program in accordance with a target program architecture file are displayed on a program editing page. Code editing portals of the corresponding functional components are provided in the editing areas, allowing a user to edit code more conveniently. Further, in embodiments of the present disclosure, program basic code uploaded by the user is received and reviewed. When the program basic code is legal, the subsequent steps of generating a program executable file and uploading the program executable file to a network platform are performed, which improves the convenience of reviewing the program basic code while improving the security of the network platform.

Similar features and functions of the exemplary system consistent with embodiment of the present disclosure may be found in the description above for the exemplary method for uploading a program.

The present disclosure may be described in a general context of computer-executable commands or operations, such as a program module, executed by a computing device or a computing system, including at least one of a microprocessor, a processor, a central processing unit (CPU), a graphical processing unit (GPU), etc. In general, the program module may include routines, procedures, objects, components, data structures, processors, memories, and the like for performing specific tasks or implementing a sequence of steps or operations.

The present disclosure may also be implemented in a distributed computing environment, and in these distributed computing environments, tasks or operations may be executed by a remote processing device connected through a communication network, e.g., the Internet. In the distributed computing environment, the program module may be located in a local or a remote non-transitory computer-readable storage medium, including a flash disk or other forms of flash memory, a Read-Only Memory (ROM), a Random Access Memory (RAM), a magnetic disk, an optical disk, a cache, a register, etc.

Furthermore, although aspects of the disclosed embodiments are described as being associated with data and/or instructions stored in a memory and/or other tangible and/or non-transitory computer-readable mediums, it would be appreciated that these data and/or instructions can also be stored on and executed from many types of tangible computer-readable storage medium, such as storage devices, including hard disks, floppy disks, or CD-ROM, or other forms of RAM or ROM. Accordingly, the disclosed embodiments are not limited to the above-described examples, but instead is defined by the appended claims in light of their full scope of equivalents.

As would be understood by persons of ordinary skill in the art, embodiments of the present disclosure may be embodied as a method, a system, or a computer program product. Accordingly, embodiments of the present disclosure may take the form of an entirely hardware embodiment, an entirely software embodiment, or an embodiment combining software and hardware for allowing a specialized device having the described specialized components to perform the functions described above. Furthermore, embodiments of the present disclosure may take the form of a computer program product embodied in one or more computer-readable storage media that may be used for storing computer-readable program codes.

Embodiments of the present disclosure are described with reference to flow charts and/or block diagrams of methods, devices (systems), and computer program products. It will be understood that each flow chart and/or block diagram can be implemented by computer program instructions. These computer program instructions may be provided to a processor of a special-purpose computer, an embedded processor, or other programmable data processing devices or systems to produce a machine or a platform, such that the instructions, when executed via the processor of the computer or other programmable data processing devices, implement the functions and/or steps specified in one or more flow charts and/or one or more block diagrams.

The computer-readable storage medium may refer to any type of non-transitory memory on which information or data readable by a processor may be stored. Thus, a computer-readable storage medium may store instructions for execution by one or more processors, including instructions for causing the processor(s) to perform steps or stages consistent with the embodiments described herein. The computer-readable medium includes non-volatile and volatile media, removable and non-removable media. The information and/or data storage can be implemented with any method or technology. Information and/or data may be modules of computer-readable instructions, data structures, and programs, or other types of data. Examples of a computer-readable storage medium include, but are not limited to, a phase-change random access memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a cache, a register, a compact disc read-only memory (CD-ROM), a digital versatile disc (DVD) or other optical storage, a cassette tape, tape or disk storage, or other magnetic storage devices, or any other non-transitory media that may be used to store information capable of being accessed by a computer device.

It should be noted that, the relational terms such as "first" and "second" are only used to distinguish an entity or operation from another entity or operation, and do necessarily require or imply that any such actual relationship or order exists among these entities or operations. It should be further noted that, as used in this specification and the appended claims, the singular forms "a," "an," and "the," and any singular use of any word, include plural referents unless expressly and unequivocally limited to one referent. As used herein, the terms "include," "comprise," and their grammatical variants are intended to be non-limiting, such that recitation of items in a list is not to the exclusion of other like items that can be substituted or added to the listed items.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as example only, with a true scope and spirit being indicated by the following claims and their full scope of equivalents.

This description and the accompanying drawings that illustrate exemplary embodiments should not be taken as limiting. Various mechanical, compositional, structural, electrical, and operational changes may be made without departing from the scope of this description and the claims, including equivalents. In some instances, well-known structures and techniques have not been shown or described in detail so as not to obscure the disclosure. Similar reference numbers in two or more figures represent the same or similar elements. Furthermore, elements and their associated features that are disclosed in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

What is claimed is:

1. A method for uploading a program based on a cloud platform, comprising:
   updating, by a server, a basic program architecture file corresponding to a target program and applicable to multiple network platforms in accordance with a program requirement document on the cloud platform, the program requirement document comprising requirements for programs of the cloud platform;
   obtaining, by the server, the updated basic program architecture file as a target program architecture file corresponding to the target program and applicable to the cloud platform;
   sending, by the server to a client, the target program architecture file corresponding to the target program and applicable to the cloud platform;
   receiving, by the server from the client, program basic code edited in accordance with the target program architecture file, the program basic code having been submitted on a program editing page of the client and edited using editing areas displayed on the program editing page, the editing areas corresponding to multiple functional components of the target program divided in accordance with the target program architecture file; and
   constructing a program executable file of the target program by combining the target program architecture file and the received program basic code, and uploading the program executable file to the cloud platform.

2. The method of claim 1, wherein sending, by the server to the client, the target program architecture file corresponding to the target program and applicable to the cloud platform further comprises:
   sending the target program architecture file to the client when a request from the client for editing the target program is received.

3. The method of claim 1, further comprising:
   providing code editing portals corresponding to the multiple functional components in the editing areas.

4. The method of claim 3, further comprising:
   generating a directory structure for indexing the multiple functional components,
   sending the directory structure to the clients; and
   displaying the directory structure.

5. The method of claim 1, further comprising:
   generating a program test file of the target program in accordance with a preset testing process document of the target program; and
   sending the program test file to the client.

6. The method of claim 5, further comprising testing the received program basic code of the target program in accordance with the program test file.

7. The method of claim 1, wherein constructing the program executable file of the target program by combining the target program architecture file and the received program basic code further comprises:

extracting, from a database of common function code, common function code relied upon by the target program in accordance with a configuration file preset for the target program;
embedding the received program basic code received from the client and the extracted common function code at a corresponding location in the target program architecture file; and
compiling and packaging the target program architecture file to generate the program executable file of the target program.

8. The method of claim 1, further comprising in response to detecting the received program basic code comprises malicious code, sending a corresponding prompt to the client.

9. The method of claim 1, before constructing the program executable file of the target program by combining the target program architecture file and the received program basic code, further comprising:
   adding, to a task list, to-be-processed tasks of constructing the program executable file and uploading the program executable file for the received program basic code;
   querying and executing the to-be-processed tasks in the task list; and
   updating the task list in accordance with an execution status of the to-be-processed tasks.

10. The method of claim 9, further comprising:
    sending the execution status of the to-be-processed tasks to the client; or
    receiving a request from the client for querying the task list, and sending a corresponding execution status.

11. The method of claim 1, wherein constructing the program executable file of the target program by combining the target program architecture file and the received program basic code further comprises:
    searching for and extracting corresponding common function code from a database of common function code when the received program basic code comprises an identifier for the corresponding common function code; or
    extracting the corresponding common function code from the database of common function code in accordance with a request from the client, and sending the corresponding common function code to the client.

12. A system for uploading a program based on a cloud platform, comprising a server, the system comprising:
    a first sending module configured to:
      update a basic program architecture file corresponding to a target program and applicable to multiple network platforms in accordance with a program requirement document on the cloud platform, the program requirement document comprising requirements for programs of the cloud platform;
      obtain the updated basic program architecture file as a target program architecture file corresponding to the target program and applicable to the cloud platform; and
      send, to a client, the target program architecture file corresponding to the target program and applicable to the cloud platform;
    a display module configured to display, on a program editing page, editing areas corresponding to multiple functional components of the target program divided in accordance with the target program architecture file;
    a receiving module configured to receive, from the client, program basic code edited for the target program architecture file by the client using the editing areas and submitted on the program editing page; and a constructing module configured to construct a program executable file of the target program by combining the target program architecture file and the received program basic code, and upload the program executable file to the cloud platform.

13. The system of claim 12, wherein:
the display module is further configured to provide code editing portals corresponding to the multiple functional components in the editing areas.

14. The system of claim 12, further comprising a second sending module configured to extract, in accordance with a request from the client, common function code from a database of common function code, and send the extracted common function code to the client.

15. The system of claim 12, further comprising a third sending module configured to generate a program test file of the target program in accordance with a preset testing process document of the target program, and send the program test file to the client.

16. The system of claim 15, further comprising a testing module configured to test program basic code of the target program in accordance with the program test file.

17. The system of claim 12, further comprising a detecting module configured to, in response to detecting that the received program basic code includes malicious code, send a corresponding prompt to the client.

18. The system of claim 12, further comprising a reporting module configured to send an execution status of to-be-processed tasks to the client, or configured to receive a request from the client for querying a task list and send a corresponding execution status of the to-be-processed tasks to the client.

19. The system of claim 12, further comprising a generating module configured to generate a directory structure for indexing the multiple functional components of the target program divided in accordance with the target program architecture file, send the directory structure to the client, and display the directory structure.

20. A non-transitory computer readable medium that stores a set of instructions that is executable by at least one processor of a server to cause the server to perform a method for uploading a program based on a cloud platform, the method comprising:
updating a basic program architecture file corresponding to a target program and applicable to multiple network platforms in accordance with a program requirement document on the cloud platform, the program requirement document comprising requirements for programs of the cloud platform;
obtaining the updated basic program architecture file as a target program architecture file corresponding to the target program and applicable to the cloud platform;
sending, to a client, the target program architecture file corresponding to the target program and applicable to the cloud platform;
receiving, from the client, program basic code edited in accordance with the target program architecture file, the program basic code having been submitted on a program editing page of the client and edited using editing areas displayed on the program editing page, the editing areas corresponding to multiple functional components of the target program divided in accordance with the target program architecture file;
constructing a program executable file of the target program by combining the target program architecture file and the received program basic code, and uploading the program executable file to the cloud platform.

21. The medium of claim 20, wherein the set of instructions that is executable by the at least one processor of the server to cause the server to further perform:
sending the target program architecture file to the client when a request from the client for editing the target program is received.

22. The medium of claim 20, wherein the set of instructions that is executable by the at least one processor of the server to cause the server to further perform:
providing code editing portals corresponding to the multiple functional components in the editing areas.

23. The medium of claim 22, wherein the set of instructions that is executable by the at least one processor of the server to cause the server to further perform:
generating a directory structure for indexing the multiple functional components,
sending the directory structure to the client; and
displaying the directory structure.

24. The medium of claim 20, wherein the set of instructions that is executable by the at least one processor of the server to cause the server to further perform:
generating a program test file of the target program in accordance with a preset testing process document of the target program; and
sending the program test file to the client.

25. The medium of claim 24, wherein the set of instructions that is executable by the at least one processor of the server to cause the server to further perform
testing the received program basic code of the target program in accordance with the program test file.

26. The medium of claim 20, wherein constructing a program executable file of the target program by combining the target program architecture file and the received program basic code further comprises:
extracting, from a database of common function code, common function code relied upon by the target program in accordance with a configuration file preset for the target program;
embedding the received program basic code received from the client and the extracted common function code at a corresponding location in the target program architecture file; and
compiling and packaging the target program architecture file to generate the program executable file of the target program.

27. The medium of claim 20, wherein the set of instructions that is executable by the at least one processor of the server to cause the server to further perform:
in response to detecting the received program basic code comprises malicious code, sending a corresponding prompt to the client.

28. The medium of claim 20, wherein before constructing a program executable file of the target program by combining the target program architecture file and the received program basic code, the set of instructions that is executable by the at least one processor of the server to cause the server to further perform:
adding, to a task list, to-be-processed tasks of constructing the program executable file and uploading the program executable file for the received program basic code;
querying and executing the to-be-processed tasks in the task list; and
updating the task list in accordance with an execution status of the to-be-processed tasks.

29. The medium of claim 28, wherein the set of instructions that is executable by the at least one processor of the server to cause the server to further perform:
- sending the execution status of the to-be-processed tasks to the client; or
- receiving a request from the client for querying the task list, and sending a corresponding execution status.

30. The medium of claim 20, wherein constructing a program executable file of the target program by combining the target program architecture file and the received program basic code further comprises:
- searching for and extracting corresponding common function code from a database of common function code when the received program basic code comprises an identifier for the corresponding common function code; or
- extracting the corresponding common function code from the database of common function code in accordance with a request from the client, and sending the corresponding common function code to the client.

* * * * *